(12) United States Patent
Weisenburger et al.

(10) Patent No.: US 11,518,267 B2
(45) Date of Patent: Dec. 6, 2022

(54) SURFBOARD WITH REPLACEMENT BATTERY AND PUSH-UP MECHANISM

(71) Applicant: WBV Weisenburger Bau+Verwaltung GMBH, Rastatt (DE)

(72) Inventors: Nicolai Weisenburger, Baden-Baden (DE); Claudia Zeiger, Karlsruhe (DE); Jochen Schneider, Stuttgart (DE)

(73) Assignee: WBV Weisenburger Bau+Verwaltung GmbH, Rastatt (DE)

( * ) Notice: Subject to any disclaimer, the term of this patent is extended or adjusted under 35 U.S.C. 154(b) by 154 days.

(21) Appl. No.: 16/956,566

(22) PCT Filed: Dec. 20, 2018

(86) PCT No.: PCT/EP2018/086133
§ 371 (c)(1),
(2) Date: Jun. 20, 2020

(87) PCT Pub. No.: WO2019/122091
PCT Pub. Date: Jun. 27, 2019

(65) Prior Publication Data
US 2021/0114695 A1 Apr. 22, 2021

(30) Foreign Application Priority Data

Dec. 21, 2017 (DE) .......................... 202017107818.3
Jan. 12, 2018 (DE) .......................... 102018100696.9

(51) Int. Cl.
*B60L 53/80* (2019.01)
*B63B 32/10* (2020.01)
(Continued)

(52) U.S. Cl.
CPC .............. *B60L 53/80* (2019.02); *B63B 32/10* (2020.02); *B63B 32/40* (2020.02); *B63B 32/50* (2020.02);
(Continued)

(58) Field of Classification Search
CPC ...... B60L 53/80; B60L 2200/32; B63B 32/51; B63B 32/57; B63B 32/50; B63B 32/10;
(Continued)

(56) References Cited

U.S. PATENT DOCUMENTS 2,944,864 A 7/1960 Krivulka
3,120,412 A * 2/1964 Caldwell .............. H05K 7/1411
312/333

(Continued)

FOREIGN PATENT DOCUMENTS

DE 10 2009 041 397 A1 3/2011
DE 20 2011 051071 U1 12/2011
DE 102013216271 A1 2/2015

OTHER PUBLICATIONS

Jetsurfing Nation: Waterwolf and Munich River Surf. Oct. 13, 2017, Videosequenzen 0:10/16:34, 1:33/16:34, 1:50/16:34; www.youtube.de.

*Primary Examiner* — Stephen P Avila
(74) *Attorney, Agent, or Firm* — Bay State IP, LLC (57) ABSTRACT

A surfboard with an electric drive (2), a battery for the electric drive (2), said battery being arranged in a battery housing (3), a first recess (4) for the battery housing (3), and a handle (5) on the battery housing (3), wherein the handle (5) is designed as a bracket handle which is mounted pivotably around a respective centre of rotation (21) at each of the handle ends on opposite sides (6) of the battery housing (3), and in each case a lug (9) protrudes from the base side of the recess below the centres of rotation (21) inside the first recess (4), and at each handle end of the bracket handle a second projection (33) is formed, which has a curved edge (34) and which rests on the lug, and a distance between a contact point of the curved edge (34) with the lug (9).

12 Claims, 9 Drawing Sheets

(51) Int. Cl.
    *B63B 32/50*     (2020.01)
    *H01M 50/249*     (2021.01)
    *H01M 50/262*     (2021.01)
    *H01M 50/256*     (2021.01)
    *B63H 21/17*     (2006.01)
    *B63B 32/40*     (2020.01)
    *B63B 32/57*     (2020.01)
    *B63B 32/51*     (2020.01)

(52) U.S. Cl.
    CPC .............. *B63B 32/51* (2020.02); *B63B 32/57* (2020.02); *B63H 21/17* (2013.01); *H01M 50/249* (2021.01); *H01M 50/256* (2021.01); *H01M 50/262* (2021.01); *B60L 2200/32* (2013.01); *H01M 2220/20* (2013.01)

(58) Field of Classification Search
    CPC ...... B63B 32/40; B63H 21/17; H01M 50/249; H01M 50/262; H01M 50/256; H01M 2220/20
    See application file for complete search history.

(56) References Cited

U.S. PATENT DOCUMENTS

| | | |
|---|---|---|
| 6,134,115 A | 10/2000 | Sim et al. |
| 2001/0042498 A1 | 11/2001 | Burnham |
| 2004/0142753 A1 | 7/2004 | Beadell et al. |
| 2011/0201238 A1 | 8/2011 | Rott et al. |

\* cited by examiner

Fig. 7

SURFBOARD WITH REPLACEMENT BATTERY AND PUSH-UP MECHANISM

CROSS REFERENCE TO RELATED APPLICATION

This application is for entry into the U.S. National Phase under § 371 for International Application No. PCT/EP2018/086133 having an international filing date of Dec. 20, 2018, and from which priority is claimed under all applicable sections of Title 35 of the United States Code including, but not limited to, Sections 120, 363, and 365(c) and which in turn claims priority under 35 USC 119 to German Patent Application No. 202017107818.3 filed on Dec. 21, 2017 and No. 102018100696.9 filed on Jan. 12, 2018.

The invention relates to a surfboard with an electric drive and a battery for the electric drive, said battery being arranged in a battery housing, and a first recess for the battery housing, and a handle on the battery housing.

Naturally, surfboards are well known. In English language usage, surfboards are boards which do not have a sail and on which a surfer can ride, powered by a wave. The German word for surfing translates as "riding the waves".

The surfboard according to the invention is a development of this type of sport. The surfer stands on the surfboard and moves preferably without a sail and without propulsion generated propulsion by means of the wave.

US 2001/0042498 A1 discloses a surfboard with an electric battery drive which can be operated by means of a rod. The batteries must be laboriously replaced.

DE 10 2009 041 397 A1 discloses a replaceable battery which exhibits a high mechanical insertion force, so that even in appliances which are subject to intensive vibrations, such as lawnmowers, it allows a reliable current supply.

The surfboard according to the invention has an electric drive. Surfboards with an electric drive are known for example from DE 20 2011 051 071. Powered surfboards are not dependent on a heavy swell, but can also be used in bodies of water which are windless and have little surf. The electric drive of the known surfboard is supplied with power by means of a battery arranged in the surfboard. For charging of the battery the surfing activity must be interrupted, the surfboard must be removed from the water and the battery must be charged by means of a conventional mains power connection. As a result the surfboard cannot be used for sporting activities while the battery is being charged. A usage time of the surfboard determined by the running time of the battery follows a charging phase which is at least equally long, the duration of which is determined substantially by the battery charging time.

The waiting phases for charging the battery are perceived as disadvantageous by the surfer.

Therefore it is an object of the present invention to provide a surfboard which avoids or at least reduces the above-mentioned disadvantage.

This object is achieved by a surfboard referred to in the introduction with the features of claim 1.

Preferred embodiments are the subject matter of the subordinate claims.

The surfboard according to the invention has an electric drive, preferably in the rear region of the surfboard; this is preferably a jet drive. The jet drive has an opening on an underwater surface of the surfboard as well as a water channel which runs from the underwater surface to a nozzle on the rear end face of the surfboard. The nozzle can be designed to be pivotable or non-pivotable. A propeller is provided in the water channel. In this case due to the high speed of the propeller water is sprayed out of the nozzle towards the rear against the direction of travel, so that the surfboard is given the necessary forward propulsion. The propeller is connected by means of a drive train to an electric motor which is supplied with power via the battery. The electric motor is preferably electrically conductively connected to a controller which transmits control signals to the motor transmitted and thus controls the output of the electric drive, that is to say the speed of the surfboard. The controller preferably receives the necessary control signals via a remote control.

According to the invention the battery of the electric drive which supplies the electric motor with power is replaceable. It is arranged in a battery housing which has a handle, preferably designed as a bracket handle, which is mounted pivotably on opposing sides of the battery housing. The battery housing can be inserted replaceably into a first recess. The first recess can be arranged in the hull of the surfboard or also in a separate drive unit, which in turn is then pushed in, inserted, etc., into the hull.

The handle is designed as a bracket handle and is mounted pivotably around a respective centre of rotation at each of the handle ends on opposite sides of the battery housing.

In each case a lug which protrudes into the first recess is arranged inside the first recess below the centres of rotation, i.e. on the base side of the recess. According to the invention at each handle end a second projection is formed, which has a curved edge and which rests on the lug so as to be movable to and fro along the edge, and the distance of the projection between a contact point of the edge with the pin and the centre of rotation contrary to the pivoting movement increases during opening. As a result the battery is lifted out of the first recess to some extent during folding up of the bracket handle. The oblique edge levers the battery out of the first recess.

During insertion of the battery, when the battery is inserted into the first recess the curved edge already rests against the lug if the latter has not yet disappeared completely in the first recess. In this case the bracket handle is folded up and is located in the opened position. The distance of the edge at the contact point with the lug decreases from the centre of rotation contrary to the pivoting movement during closing.

As a result the battery is slowly lowered onto the base of the first recess.

The handle preferably has a locking mechanism with the first recess in the hull of the surfboard, wherein the handle preferably has on each of the opposing sides a projection which, during insertion of the battery housing into the first recess in the hull of the surfboard, by folding down of the handle of the battery housing, in each case preferably engages under a lug arranged on the inner wall of the first recess in the hull of the surfboard. During removal of the battery housing from the first recess in the hull of the surfboard, the locking mechanism releases the lug by folding up of the handle. In the folded-up state the bracket of the handle is at the greatest possible distance from the battery housing, and in the folded-down state it is at the smallest possible distance.

The first recess for accommodating the battery housing in the hull of the surfboard is preferably arranged below the deck of the surfboard. The inserted battery can be covered retrospectively by a region of the deck or the upper side of the battery housing can be part of the deck.

The battery housing with the battery can be inserted with only one hand and with only one handle into the first recess in the hull of the surfboard, and the locking mechanism can be triggered automatically by folding down of the handle, so that the battery housing with the battery is fixed in the first recess. Likewise, with only one hand and with only one handle, by folding up of the handle and thus automatic release of the locking, the fixing of the battery housing in the first recess can be overridden and the battery housing with the battery can be removed from the first recess.

The battery is preferably connected to the electric motor in the surfboard via the battery housing by a high-current plug. For this purpose a pylon can be mounted on the base wall of the recess. As a counterpart to the pylon, a second recess with a socket to accommodate the pylon is provided on the underside of the battery housing, which faces a base of the recess during insertion of the battery housing. After insertion of the battery housing into the first recess in the hull of the surfboard and folding down of the handle, the socket and the pylon are arranged in relation to one another so that they form an electrical plug contact, preferably a high-current plug contact. In a further variant of an embodiment, the pylon and the socket can also be interchanged.

The battery is preferably designed in one piece with precisely one battery housing. However, it can also be in two, three or more parts and can consist of one, two or more individual battery housings, each of which can have an associated handle. Alternatively, two handles can be provided for each battery housing.

According to the invention, the battery preferably has a rated voltage of 24 V to 100 V. It preferably has a capacitance of 25 Ah to 100 Ah. Its output is preferably in the range from 0.8 kWh to 10 kWh. The battery in the battery housing is preferably assigned an IP protection rating of 67 and higher, in particular the IP protection rating 67, 68 or 69.

According to a first embodiment, the surfboard can consist of a continuously solid hull. In the first embodiment the battery is provided in the interior of the hull and is arranged in a battery housing which is arranged in the first recess in the continuously solid hull, preferably in the rear part of the surfboard.

In a second embodiment the surfboard has an inflatable hull and a drive unit which at least also forms a stern of the surfboard and is preferably releasably connected to the inflatable hull. As a result the surfboard can be transported more easily. In the second embodiment the drive unit includes the electric drive, and the battery is arranged in the first recess in the drive part of the hull. The inflatable hull component advantageously has two lateral arms which engage in a U shape around the drive unit.

In a preferred second embodiment of the invention the inflatable hull component is manufactured from a drop-stitch material, in which two or more synthetic fabric webs, preferably denier polyester fabric webs, are laid one above the other. The two synthetic fabric webs are connected to one another by a plurality, i.e. thousands, of polyester threads. These polyester threads predetermine the envisaged shape of the board when the space between the fabric webs is filled with compressed air.

The polyester threads are sewn to the two fabric webs on both faces. The two fabric webs which are sewn to one another form the support structure which gives the hull component its mechanical strength in the inflated state. The two fabric webs which are connected to one another are cut to the required shape. The upper and lower fabric webs are coated with PVC layers, preferably with three layers, and are pressed and bonded layer by layer. The faces are glued, overlapping, to the seam strip and are pressed, so that the airtight inflatable hull component is produced.

The drop-stitch method makes it possible to produce the inflatable hull component with outstanding mechanical strength properties, which withstand not only tensile loads but also compressive loads and shearing loads. The drop-stitch outer skin of the inflatable hull component is airtight and in the inflated state is exceptionally resistant to deformation, so that a surfer can stand and surf on the hull component whilst retaining the external shape of the inflated hull component. The inflatable hull component is filled with air under high pressure. The filling can take place by means of an air pump or a compressor. The compressor can be supplied with electrical energy by batteries incorporated in the surfboard.

The inflatable hull component manufactured from the drop-stitch material is preferably low-noise because the volume of sound generated by the breaking of waves, but also by the electric drive, is damped by the hull. The inflatable hull component is subject to little vibration during operation because vibrations are reduced by the drop-stitch material. Since the inflatable hull component is slightly deformable, impacts and waves etc. are advantageously absorbed. Furthermore, it is advantageous that the softer hull causes fewer injuries, for example if the surf board collides with the surfer in the event of the surfer falling off.

While carrying on the sport the surfer stands on the deck of the surfboard and keeps his balance for example by gripping a rope which is fastened to the bow of the surfboard and on which a handle is preferably located.

The deck is formed by an upper side of the surfboard.

In the first embodiment the deck is formed by the upper side of the solid hull.

In the second embodiment a part of the deck is formed by the upper side of the drive unit and another part is formed by the upper side of the inflated hull part.

After insertion of the battery housing into the first recess in the hull of the surfboard the handle of the battery housing can preferably be recessed below the deck. Particularly preferably, after the handle has been folded down it can be recessed in a third recess in the battery housing. The handle preferably has a lifting device. This can be for example a strap, a loop or a projection or any device by means of which the handle can be gripped and lifted. Alternatively, the battery housing or the surfboard has a fourth recess which enables the gripping and lifting of the handle.

After the insertion of the battery housing the upper side of the surfboard preferably also forms a flat deck. For this purpose an upper side of the battery housing can be designed in various ways.

In a first embodiment of the battery housing the upper side of the battery housing and the upper side of the surfboard form a flat deck for the surfer. In this case a depth of the first recess is dimensioned so that it corresponds to the height of the battery housing. After the insertion of the battery housing the upper side of the surfboard and the upper side of the battery housing are aligned. The handle, preferably the bracket handle, which is folded in is likewise aligned with the surface, so that the surfer can move without danger on the deck.

In a second embodiment of the battery housing a side wall of the first recess has a groove, preferably a peripheral groove, along the upper side of the surfboard, and the upper side of the battery housing has a peripheral overlap which rests on the groove or lies in the groove after the insertion of the battery housing into the first recess. The upper side of the surfboard, the overlap and the upper side of the battery housing form a flat deck for the surfer. Here too, the depth of the first recess corresponds to the height of the battery housing.

In a third embodiment of the battery housing a separate cover is provided, which can be inserted into the groove running round the side wall of the first recess along the upper side of the surfboard, so that a flat deck is formed by the upper side of the cover and the upper side of the surfboard. The battery housing is arranged separately, preferably spaced apart by a small gap, in the hull below the cover. The height of the battery housing is smaller than the depth of the recess by at least the thickness of the cover, so that the cover can be arranged above the battery housing and nevertheless a flat deck is formed.

The separate cover can be clamped in the groove or can be fastened by additional fastening means such as clamp closures, magnets etc. The cover is preferably a solid lid which does not bend even when stepped on.

The invention is described with reference to an exemplary embodiment in seven drawings. In the drawings.

Figure 1:
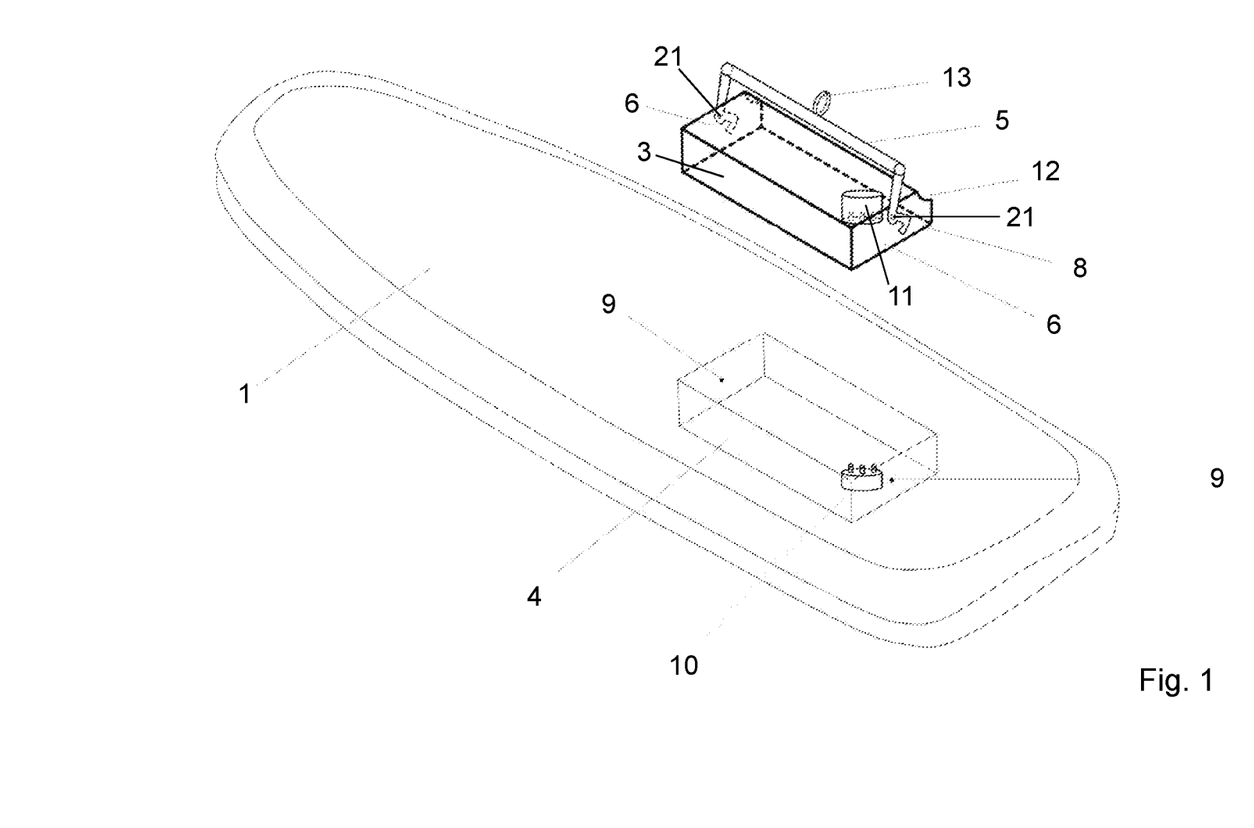
FIG. 1 shows a surfboard according to the invention with a first recess in the hull and a battery housing which is not inserted into the first recess.

FIG. 1 shows a schematic oblique view of a surfboard 1 according to the invention with a first recess 4 in the hull of the surfboard 1 and a battery housing 3, wherein the battery housing 3 is not yet inserted into the first recess 4.

The surfboard 1 has a continuously solid hull in a first embodiment. The first recess 4 is arranged in the stern part of the surfboard 1. The battery housing 3 has a bracket handle 5 which is mounted pivotably at centres of rotation 21 on opposite faces 6 of the battery housing 3. The bracket handle 5 is illustrated in the folded-up state in FIG. 1.

A pylon 10 is located on a base wall of the first recess 4. A second recess 11 with a socket is located on an underside of the battery housing 3. It constitutes the counterpart piece to the pylon 10.

Figure 2:
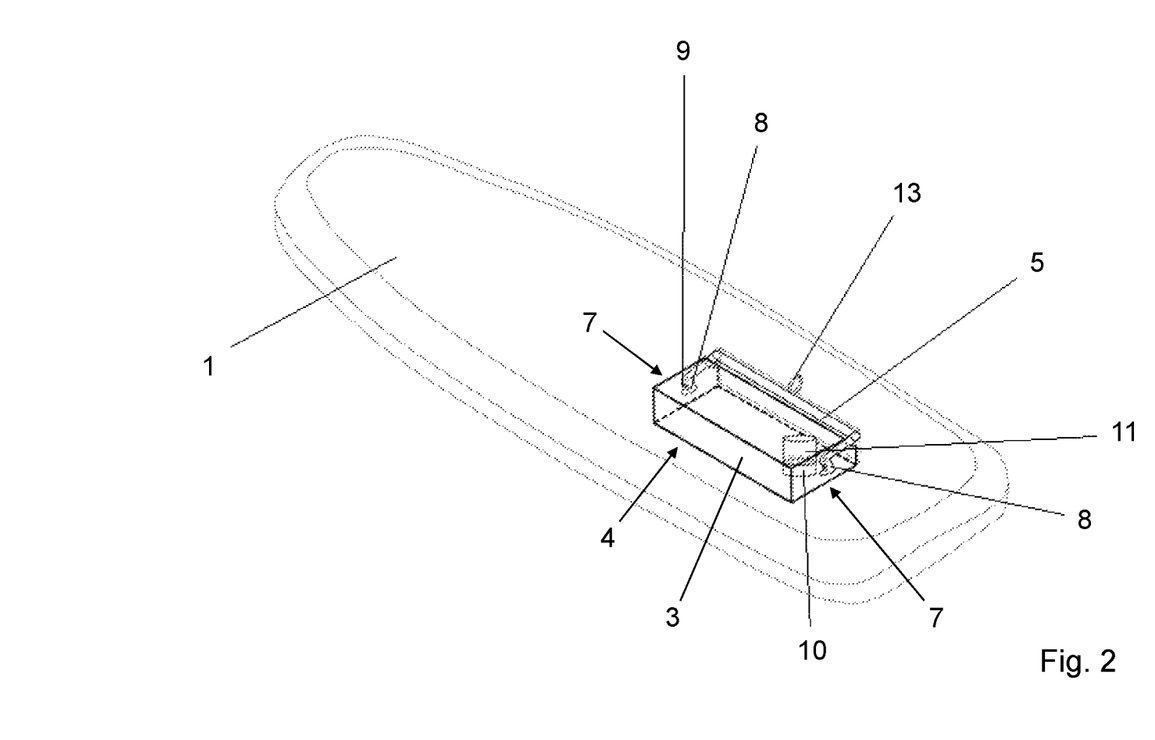
FIG. 2 shows a surfboard according to the invention with the first recess in the hull and the battery housing, with the bracket handle folded down, inserted into the first recess.

FIG. 2 shows the surfboard according to FIG. 1, wherein the battery housing 3 is inserted in the first recess 4 and the bracket handle 5 is folded down.

The pylon 10 has been accommodated by the second recess 11, which is designed as a socket. The socket and the pylon 10 form an electrical plug contact.

Figure 3:
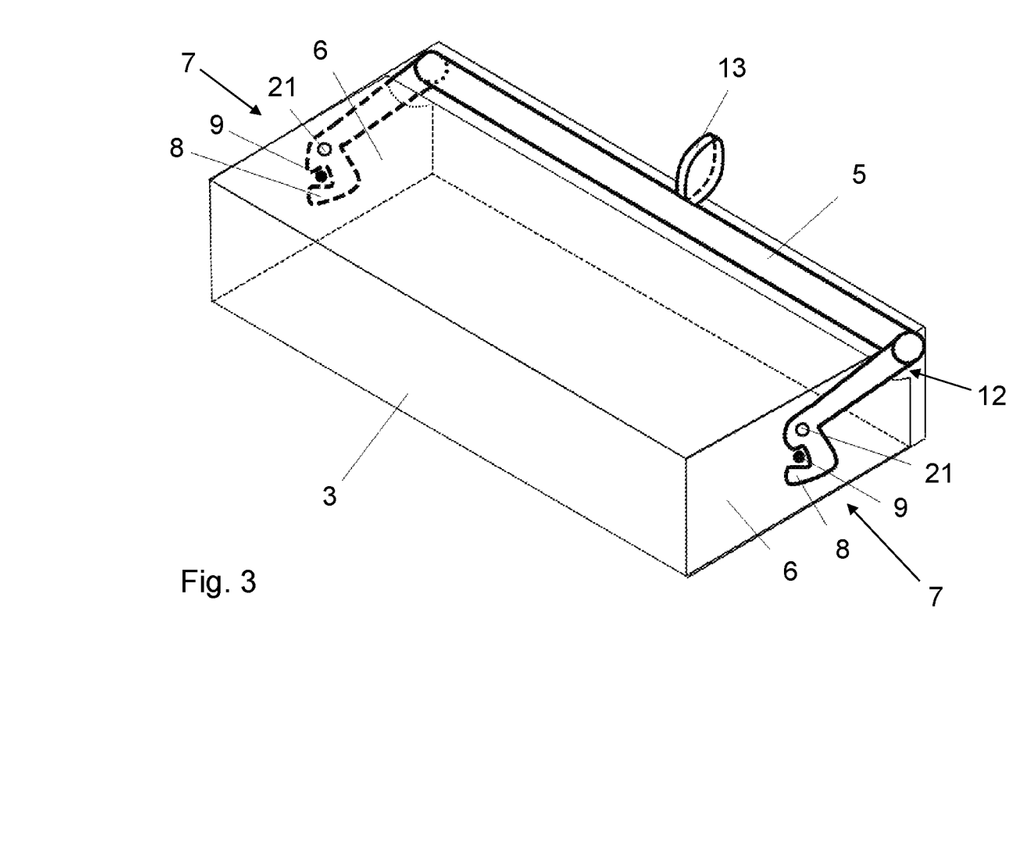
FIG. 3 shows a detail of the battery housing with locked bracket handle according to FIG. 2 inserted into the first recess.

FIG. 3 shows a view of a detail of the battery housing 3 according to FIG. 2, which is inserted in the first recess 4 with the bracket handle 5 folded down. On the opposing sides 6 of the battery housing 3 the bracket handle 5 has first projections 8 which, as the bracket handle 5 is folded down, each engage under a lug 9 arranged on the inner wall of the first recess 4 on opposing sides. As the bracket handle 5 is folded down, the bracket handle 5 is rotated about the centres of rotation 21 so that the first projections 8 of the bracket handle 5 automatically engage under the lugs 9 of the first recess 4 and trigger the locking mechanism 7. After insertion into the first recess 4 the battery housing 3 is firmly fixed by folding down of the bracket handle 5. After the bracket handle 5 has been folded down it is recessed in a third recess 12 in the battery housing 3. In FIG. 3 a loop is provided as a lifting device 13 for the bracket handle 5. If the bracket handle 5 is lifted on the loop 13, it rotates about the centres of rotation 21 so that the first projections 8 clear the lugs 9 and the locking mechanism 7 is released.

Figure 4:
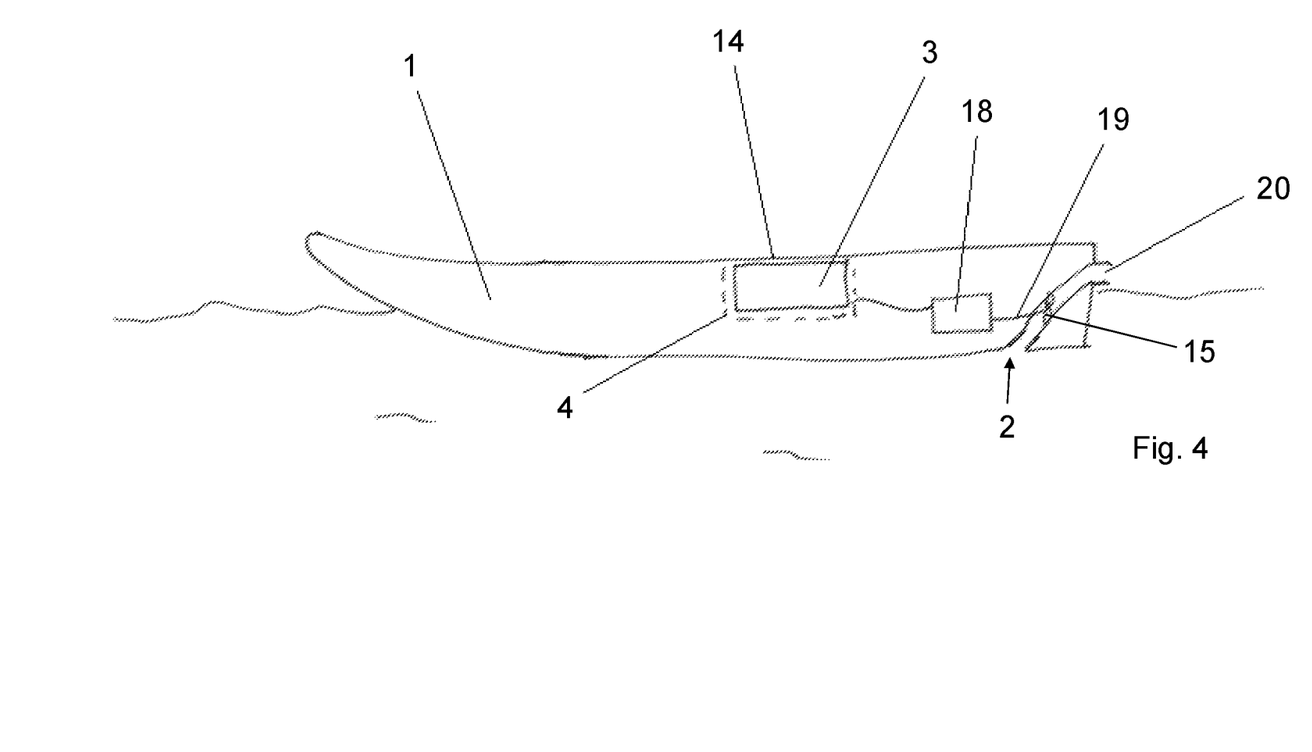
FIG. 4 shows a sectional view of the surfboard according to the invention.

FIG. 4 shows a sectional view of the surfboard 1 according to the invention. The surfboard 1 has a continuously solid hull according to a first embodiment. The first recess 4 is arranged in the stern part of the hull in the upper side of the board. It has a cover 14, the outer side of which forms a continuous surface with the upper surface of the surfboard. The battery is inserted in the battery housing 3 in the first recess 4, and the cover 14 is closed. The bracket handle 5 of the battery housing 3 is folded down and recessed below a deck 36. The battery supplies power to an electric motor 18 of a jet drive 2. The jet drive 2 has a water inlet on the underwater surface of the surfboard as well as a water channel, a nozzle 20 at the rear end of the water channel and a rotor 15 which is connected by means of a drive train 19 to the electric motor 18 and during rotation pushes water towards the rear through the water channel, which then sprays out through the nozzle 20 contrary to the direction of travel and thus gives the surfboard 1 the necessary forward propulsion.

Figure 5:
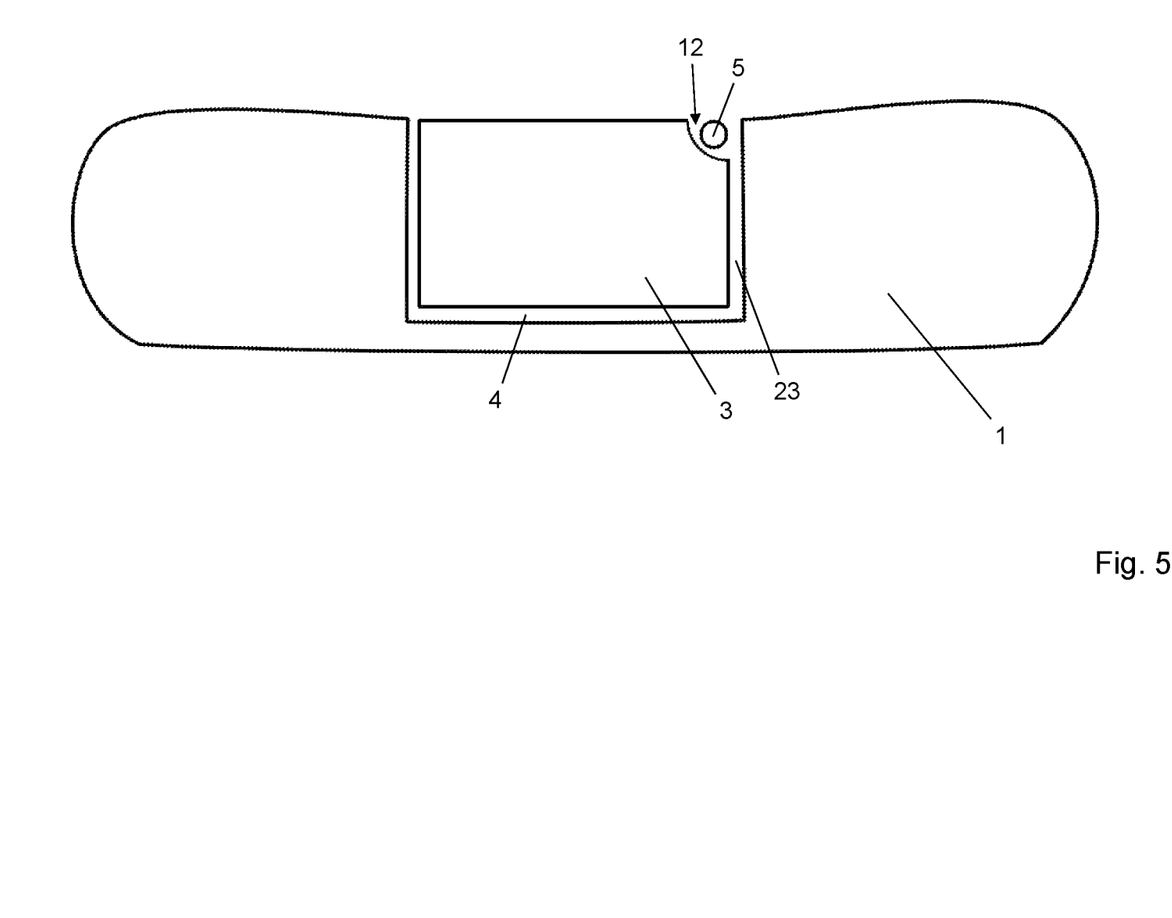
FIG. 5 shows a sectional view of a first embodiment of the battery housing.
Figure 6:
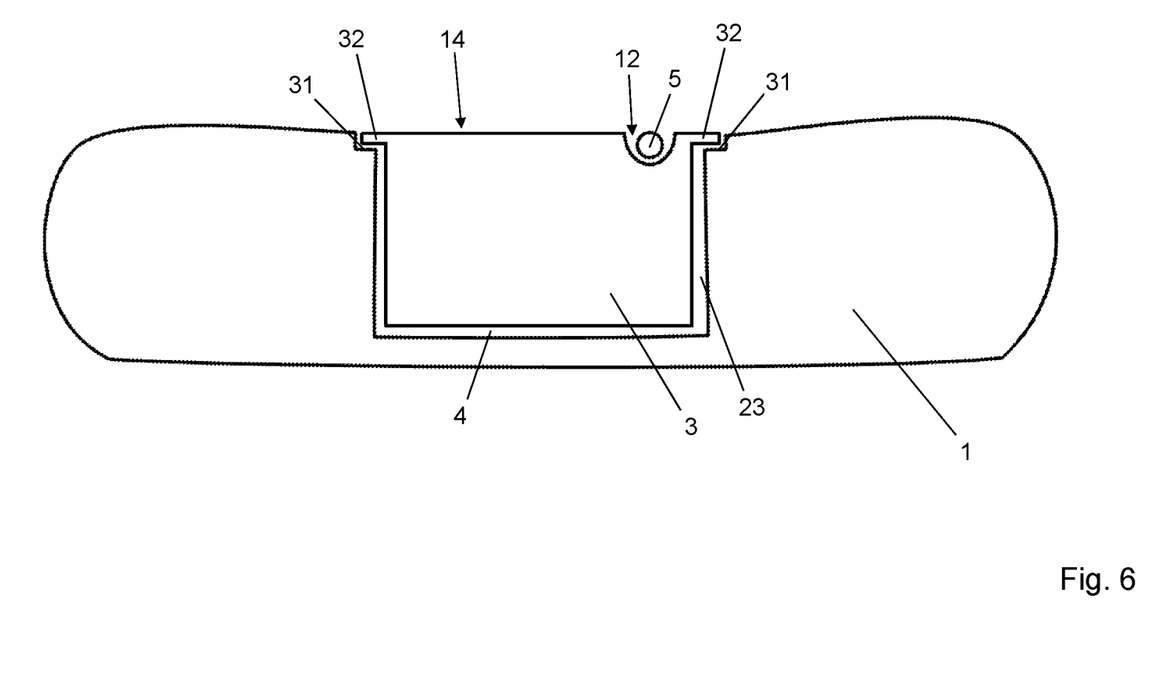
FIG. 6 shows a sectional view of a second embodiment of the battery housing with overlapping edge.
Figure 7:
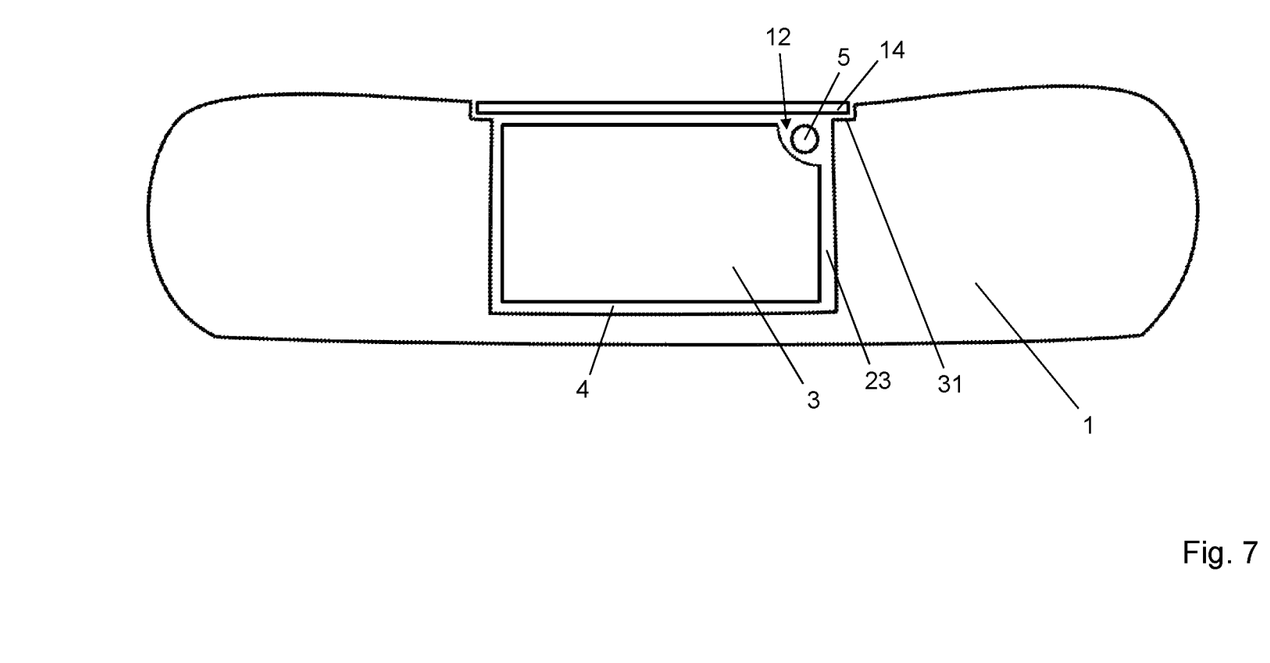
FIG. 7 shows a sectional view of a third embodiment of the battery housing with separate cover.
Figure 8A:
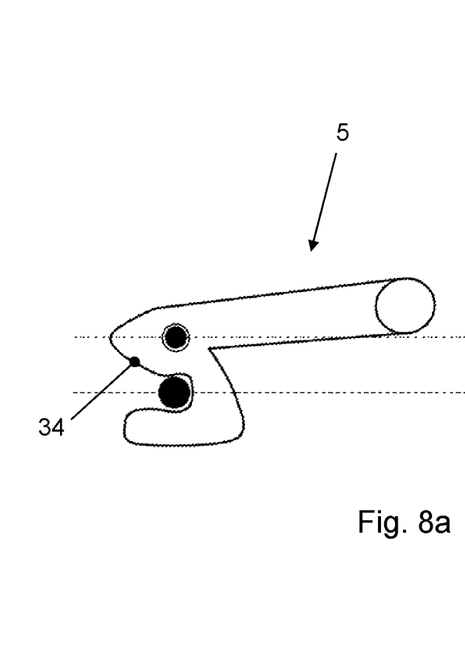
FIGS. 8a-8d show a side view of the basic mode of operation of a push-up mechanism.
Figure 8B:
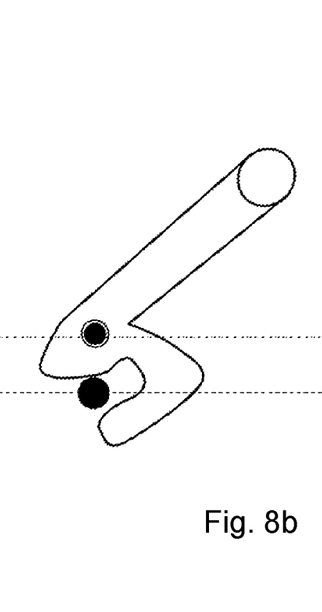
Figure 8C:
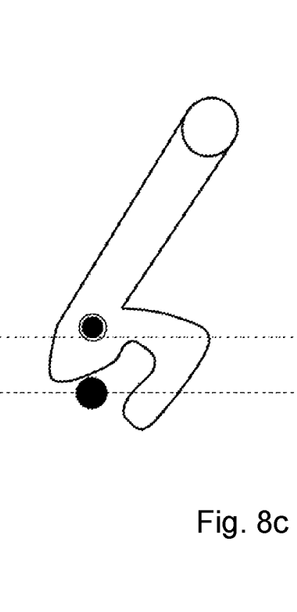
Figure 8D:
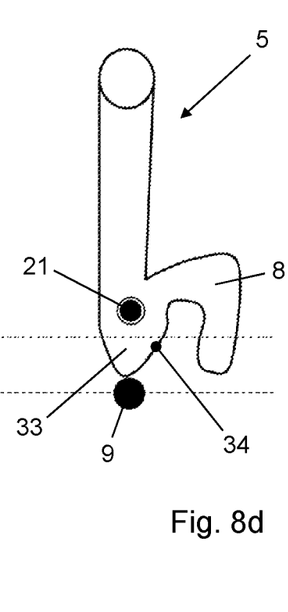

FIGS. 5, 6 and 7 show various embodiments of the battery housing 3, in particular an upper side facing the upper side of the board.

In FIG. 5 the battery housing 3 is so designed that the upper side of the battery housing 3 forms a flat surface with the upper side of the surfboard 1, so that an overall deck is produced. A gap 23 between the battery housing 3 and the side wall of the first recess 4 is shown wider in FIG. 5 than it would be if drawn to scale. The bracket handle 5 is folded into the third recess 12 of the battery housing 3, so that an upper side of the bracket handle 5 is likewise arranged in a plane with the upper side of the battery housing 3 and with the upper side of the surfboard 1 and forms an overall deck.

FIG. 6 shows a second embodiment of the battery housing 3, the upper side of which is greater than a cross-sectional surface of the first recess 4. The upper side of the battery housing 3 has an overlap 32 and thus forms a cover 14 or a lid which is formed integrally with the battery housing 3 and overlaps lateral walls of the first recess 4. An end of the lateral wall of the first recess 4 on the upper side of the board has a peripheral groove 31 into which the overlap 32 is laid. A height of the groove 31 corresponds to a thickness of the overlap 32, so that after the insertion of the battery housing 3 into the first recess 4 a flat deck 36 is formed by the upper side of the surfboard 1 and the upper side of the battery housing 3. The third recess 12, which accommodates the folded-down bracket handle 5, is introduced in the upper side of the battery housing 3. With the battery housing 3 inserted, a penetration of water into the first recess 4 can be prevented by a seal which is not shown here, for example a rubber seal, between the overlap 32 and the groove 31.

FIG. 7 shows a third embodiment of the battery housing 3 according to the invention. The battery housing 3 is completely inserted into the first recess 4, and in fact is inserted deeper than in the first embodiment according to FIG. 5. The peripheral side wall of the first recess 4 again has the groove 31, but in the third embodiment a non-slip separate cover 14 is laid into this groove. In this case the height of the battery housing 3 is so dimensioned that in the inserted state it is positioned below or at the same height as a lower contact surface of the groove 31, so that the cover 14 can be laid into the groove 31 above the battery housing 3 and preferably a small air gap remains between the upper side of the battery housing 3 and an underside of the cover 14. The cover 14 itself has an eyelet, hole or the like (not shown), with the aid of which it can be removed from the groove 31. The cover 14 can be clamped in the upper side of the surfboard in the groove 31, or additional fastening means (not shown) in the form of clamping closures, magnets or the like can be provided. With the battery housing 3 inserted, penetration of water into the first recess 4 can be prevented by a seal (not shown here), for example a rubber seal, between the cover 14 and the groove 31.

FIGS. 8a-8d show, from left to right in a lateral view, the push-up mechanism during opening of the bracket handle 5 and removal of the battery housing 3 with the battery. The bracket handle 5 has a second projection 33 at each of its two bracket handle ends. The second projection 33 in turn has a curved edge 34, which during the opening and during the closing of the bracket handle 5 continuously abuts the lug 9, wherein a distance between a contact point of the curved edge 34 with the lug 9 and the centre of rotation 21 increases contrary to the pivoting movement of the second projection 33 during opening of the bracket handle 5. Due to the increase in the distance between the centre of rotation 21 and the lug 9, and due to the fact that the centre of rotation 21 and the lug 9 move exclusively in the vertical direction in relation to one another and not in the horizontal direction, during the pivoting movement of the bracket handle 5 out of the closed position in FIG. 8a the centre of rotation 21 moves continuously via the position in FIGS. 8b and 8c into the open position in FIG. 8d, in which the distance of the centre of rotation 21 from the lug 9 continuously becomes greater and as a result the battery housing 3 with the battery is continuously lifted out of the first recess 4. This facilitates removal of the battery housing 3.

The locking mechanism 7 provided by the first projection 8 engaging under the lug 9 is dimensioned relative to the second projection 33 in such a way that the first projection 8 engages under the lug 9 in the closed position and in the closed position the oblique edge 34 does not abut the lug 9 at all or only abuts it with the minimum distance from the centre of rotation 21, whilst in the open position the first projection 8 is completely pivoted out under the lug 9, so that the locking mechanism 7 is opened by the first projection 8 and simultaneously the oblique edge 34 abuts the lug 9 with its greatest distance between the contact point and the centre of rotation 21.

Figure 9A:
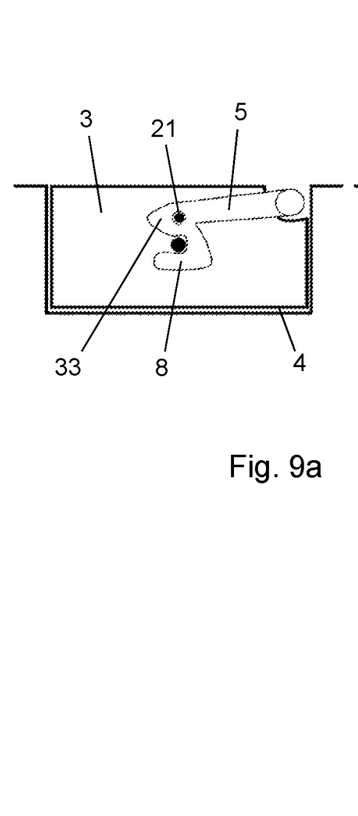
FIGS. 9a-9d show a side view of the push-up mechanism attached to the battery.
Figure 9B:
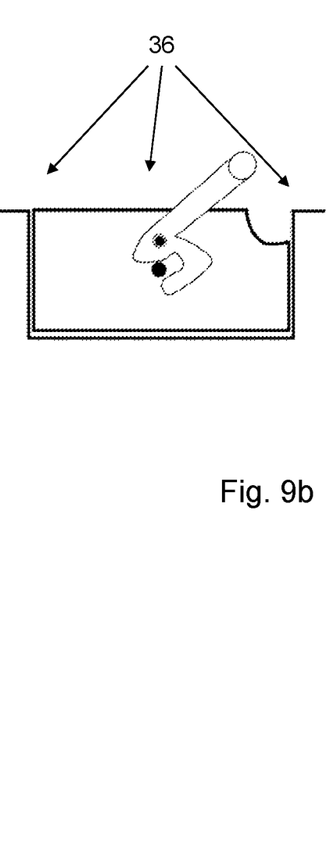
Figure 9C:
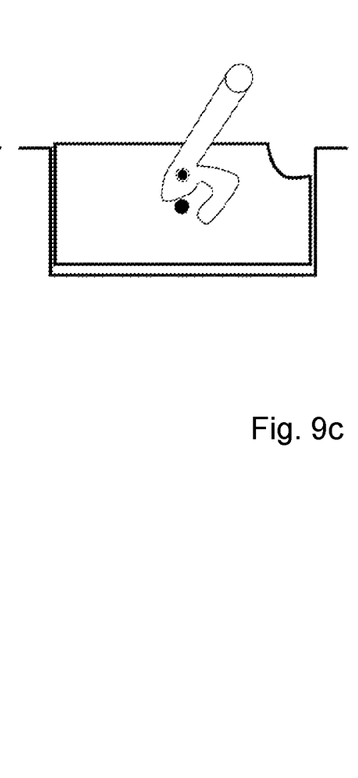
Figure 9D:
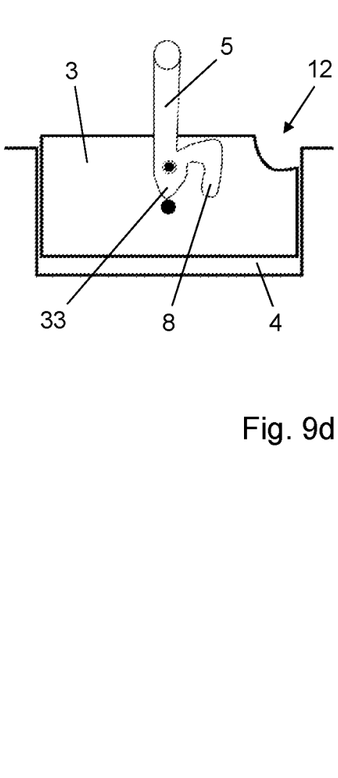

In FIGS. 9a-9d the push-up mechanism is shown mounted on the battery housing according to the invention 3. The centre of rotation 21 is actually an axle or equally a lug or pin, which is arranged in a fixed position on the battery housing 21 and about which the bracket handle 5 is pivotably movable on both sides from the open position into the closed position. The lug 9 is mounted in a fixed position inside the first recess 4. The bracket handle 5 in FIG. 9a is located in the closed position and is pivoted via the positions in FIGS. 9b and 9c into the open position in FIG. 9d. In FIG. 9a the bracket handle 5 is arranged horizontally. In FIG. 9d it is vertical, wherein "horizontal" and "vertical" relate to the plane formed by the deck 36 of the surfboard 1.

During insertion of the battery housing 3 the pivoting movement of the bracket handle 5 is opposite to the pivoting movement during removal. According to FIG. 9d the battery housing 3 is inserted into the first recess 4, whilst the bracket handle 5 is folded up perpendicularly, so that the oblique edge 34 is placed on the lug 9 and there is a maximum distance between the lug 9 and the centre of rotation 21. By continuous movement of the bracket handle 5 from the open position into the closed position via the positions of FIGS. 9c and 9b, the bracket handle 5 is pivoted into the closed position according to FIG. 9a. In this position the distance between the lug 9 and the centre of rotation 21 is minimal and the first projection 8 engages under the lug 9 and locks the battery housing 3, with the battery arranged therein, in the first recess 4.

The minimum distance of the contact point of the oblique edge 34 on the lug 9 from the centre of rotation 21 occurs in the closed position. In this case the oblique edge 34 has a distance from the centre of rotation 21, i.e. the centre point of the axis of rotation of the bracket handle 5 on the battery housing 3 which corresponds to the distance between the outer wall of the lug 9 and the centre of rotation 21, wherein the battery housing 3 completely disappears in the first recess 4. In this case the deck 36 of the battery housing 3 and the deck 36 of the surfboard 1 forms a complete common deck 36.

LIST OF REFERENCE NUMERALS 1 surfboard
2 electric drive/jet drive
3 battery housing
4 first recess
5 bracket handle
6 opposing sides
7 locking mechanism
8 first projection
9 lug
10 pylon
11 second recess
12 third recess
13 lifting device/loop
14 cover
15 rotor
18 electric motor
19 drive train
20 nozzle
21 centre of rotation
23 gap
31 groove
32 overlap
33 second projection
34 edge
36 deck

The invention claimed is:

1. A Surfboard comprising:
an electric drive (2), and
a battery for the electric drive (2), said battery being arranged in a battery housing (3),
a first recess (4) for the battery housing (3), and
a handle (5) on the battery housing (3), characterized in that
the handle (5) is designed as a bracket handle, which is mounted pivotably around a respective centre of rotation (21) at each of the handle ends on opposite sides (6) of the battery housing (3), and in each case a lug (9) protrudes from the base side of the recess below the centres of rotation (21) inside the first recess (4), and at each handle end of the bracket handle a second projection (33) is formed, and a second projection (33) and the bracket handle (5) can each be pivoted around the centre of rotation (21) and the second projection (33) has a curved edge (34) and which rests on the lug, and a distance between a contact point of the curved edge (34) with the lug (9) and the centre of rotation (21) contrary to the pivoting movement increases during opening of the bracket handle.

2. Surfboard according to claim 1, characterised in that the handle (5) has a first projection (8) on each of the opposing sides (6) which in each case engages under a lug (9) inside the first recess.

3. Surfboard according to claim 1, characterised in that during insertion of the battery housing (3) into the first recess (4), by folding down of the handle (3), the first projection (8) engages under the pin (9) and frees the lug (9) by folding up of the handle (5) during removal of the battery housing (3).

4. Surfboard according to claim 1, characterised in that a pylon (10) is provided on the base wall of the first recess (4) and the battery housing (3) has a second recess (11) with a socket to accommodate the pylon (10), wherein after insertion of the battery housing (3) into the first recess (4) and engagement of the first projection (8) under the lug (9) by folding down of the handle (5), the socket and the pylon (10) are arranged so that they form an electrical plug contact.

5. Surfboard according to claim 1, characterised in that the handle (5) can be recessed below a deck (36).

6. Surfboard according to claim 1, characterised in that after the handle (5) has been folded down it is recessed in a third recess (12) in the battery housing (3).

7. Surfboard according to claim 1, characterised in that the handle (5) has a lifting device (13).

8. Surfboard according to claim 1, characterised in that the first recess (4) is arranged in an upper side of the surfboard (1).

9. Surfboard according to claim 1, characterised in that an upper side of the battery housing (3) and the upper side of the surfboard (1) form a flat deck (36).

10. Surfboard according to claim 1, characterised in that on the upper side of the surfboard (1) a side wall of the first recess (4) forms a groove (31) into which a cover (14) is inserted and an upper side of the cover (14) and the upper side of the surfboard (1) form a flat deck (36).

11. Surfboard according to claim 10, characterised in that the side wall of the first recess (4) forms the groove (31) on the upper side of the surfboard, and the upper side of the battery housing (3) forms an overlap (32), and the overlap (32) lies in the groove (31) and the upper side of the battery housing (3) with the overlap (32) and the upper side of the surfboard (1) for the flat deck (36).

12. Surfboard according to claim 1, characterised by an inflatable hull component and a drive unit and characterised in that the battery and the electric drive (2) are arranged in the drive unit and the drive unit is arranged releasably on the hull component.

* * * * *